(12) United States Patent
Ding et al.

(10) Patent No.: US 12,338,420 B2
(45) Date of Patent: Jun. 24, 2025

(54) SYSTEM AND METHOD FOR SIMULTANEOUSLY PREPARING ALCOHOL-FREE WINE AND HIGH-ALCOHOL LIQUOR

(71) Applicant: JIANGSU JIUMO HIGH-TECH CO., LTD., Nanjing (CN)

(72) Inventors: Xiaobin Ding, Nanjing (CN); Xiangqiang Zhao, Nanjing (CN); Xuefei Sun, Nanjing (CN); Pingping Dai, Nanjing (CN); Rui Tu, Nanjing (CN)

(73) Assignee: JIANGSU JIUMO HIGH-TECH CO., LTD., Nanjing (CN)

( * ) Notice: Subject to any disclaimer, the term of this patent is extended or adjusted under 35 U.S.C. 154(b) by 880 days.

(21) Appl. No.: 17/298,148

(22) PCT Filed: Apr. 17, 2019

(86) PCT No.: PCT/CN2019/083038
§ 371 (c)(1),
(2) Date: May 28, 2021

(87) PCT Pub. No.: WO2020/107776
PCT Pub. Date: Jun. 4, 2020

(65) Prior Publication Data
US 2021/0348093 A1    Nov. 11, 2021

(30) Foreign Application Priority Data

Nov. 29, 2018 (CN) .......................... 201811441051.2

(51) Int. Cl.
*C12H 1/07* (2006.01)
*B01D 61/36* (2006.01)
*C12G 1/00* (2019.01)

(52) U.S. Cl.
CPC ......... *C12H 1/063* (2013.01); *B01D 61/3621* (2022.08); *C12G 1/00* (2013.01)

(58) Field of Classification Search
CPC .. B01D 71/52; B01D 61/3621; B01D 61/362; B01D 71/701; B01D 69/12; B01D 71/82;
(Continued)

(56) References Cited

U.S. PATENT DOCUMENTS 5,385,647 A * 1/1995 Brueschke ........... B01D 61/362
426/387

* cited by examiner

*Primary Examiner* — Vera Stulii
(74) *Attorney, Agent, or Firm* — Proi Intellectual Property US

(57) ABSTRACT

A system for simultaneously preparing alcohol-free wine and high-alcohol liquor, comprising a primary membrane separation system and a secondary membrane separation system. An inlet of the primary membrane separation system is connected to raw materials, and a permeation side of the primary membrane separation system is connected to an inlet of the secondary membrane separation system; both the primary membrane separation system and the secondary membrane separation system comprise an organic matter preferentially-permeable pervaporation membrane. The method for simultaneously preparing the alcohol-free wine and the high-alcohol liquor comprise the following steps: feeding the wine produced by fermentation into the primary membrane separation system, ethanol and aromatic substances therein permeating the membrane in a vapor form to form a primary permeating fluid with alcohol content of 28-32°, and a primary residual permeating fluid being the alcohol-free wine with alcohol content of less than 0.5°.

8 Claims, 1 Drawing Sheet

(58) Field of Classification Search
CPC ...... B01D 71/70; B01D 69/148; C12H 1/063; C12H 3/04; C12H 6/00; C12G 1/14; C12G 1/00
See application file for complete search history.

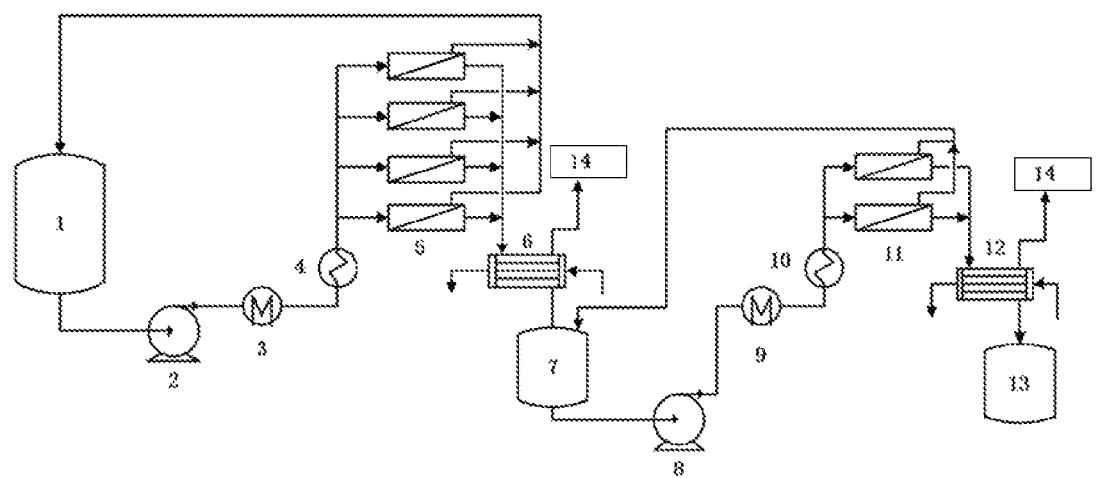

SYSTEM AND METHOD FOR SIMULTANEOUSLY PREPARING ALCOHOL-FREE WINE AND HIGH-ALCOHOL LIQUOR

TECHNICAL FIELD

The present invention belongs to the technical field of pervaporation membrane separation, in particular to a system and method for simultaneously preparing alcohol-free wine and high-alcohol liquor.

BACKGROUND ART

Wine is a kind of fruit wine made from grapes. Its alcohol content is higher than beer but lower than white wine. It is rich in nutrition and has obvious health care effects. Some people think that wine is one of the healthiest and most hygienic beverages. It can adjust the performance of metabolism, promote blood circulation and prevent the increase of cholesterol. It further has the effects of diuresis, stimulating liver function and preventing aging. It is also an adjuvant for the treatment of heart disease and can prevent diseases such as scurvy, anemia, beriberi, indigestion and keratitis, etc. Drinking wine often can reduce the risk of heart disease, blood lipids and vascular sclerosis.

In recent years, with the improvement of people's living standards and the enhancement of health awareness, as well as the strict supervision of drunk driving by traffic control departments, more and more people like alcohol-free and low-alcohol wine. Due to its low alcohol content, this type of beverage not only reduces the harm of alcohol to the human body but also maintains its original flavor and nutritional value to a large extent. It is especially suitable for many kinds of groups, such as women, the elderly, children, drivers, patients and fashionable youth, etc. Under the above background, the international community is very optimistic about the market prospects of alcohol-free and low-alcohol wine, and is currently actively developing and producing such products.

The Technical Specifications for Wine in China implemented on Jan. 1, 2003 clearly defines that alcohol-free wine refers to alcoholic beverage that is made from fresh grapes or grape juice through full or partial fermentation and dealcoholization through special processes, with the alcohol content of not exceeding 1% (v/v). There are two main methods for producing alcohol-free beverages in the world. One is to limit the fermentation so as to reduce the alcohol content produced during winemaking fermentation, and the other is to remove the alcohol contained in the alcoholic beverage after it is made. The former method mainly comprises specific yeast fermentation, changing the saccharification process and changing the fermentation process, etc. It does not require additional equipment investment, but the process is complicated. In addition, while limiting the generation of ethanol, it also limits the generation of other flavor substances in the wine to a large extent, thereby reducing the wine quality. Since the 1980s, there has been an endless stream of research on the latter method, which has basically replaced the former one. Such research methods mainly comprise unit operations such as distillation, extraction, membrane separation, supercritical and frozen crystallization, etc. Among them, pervaporation method is a new type of membrane separation method currently used to prepare alcohol-free fermented beverages. It achieves separation by making use of the difference in dissolution and diffusion rate of the components passing through the membrane under the driving by vapor pressure difference of the components in the liquid mixture. The significant advantage of this technology for application to wine dealcoholization lies in that it can be operated at atmospheric pressure at a temperature slightly higher than room temperature, which avoids the adverse effects of heating operations in traditional techniques such as distillation on the quality of wine and beverages. Moreover, no other chemical reagents are required to be introduced in the process, which avoids product contamination. At the same time, the high-alcohol liquor collected on the permeate side can also be used as a feed for the production of other alcoholic beverages. Therefore, the pervaporation process has great advantages and potential in the field of alcoholic beverage dealcoholization.

SUMMARY OF THE INVENTION

The purpose of the present invention is to provide a system and method for preparing alcohol-free wine beverage from ordinary wine and simultaneously obtaining high-alcohol liquor. While preserving the nutrients and effects of wine, it eliminates the negative effects of alcohol on the human body, and the obtained high-alcohol liquor can also be used to prepare other spirits. The process has the characteristics of high efficiency, reliable process, and suitable for industrial production, etc.

To achieve the above purpose, the following technical solutions are adopted in the present invention:

A system for simultaneously preparing alcohol-free wine and high-alcohol liquor, comprising a primary membrane separation system and a secondary membrane separation system, wherein an inlet of the primary membrane separation system is connected to feeds, and a permeate side of the primary membrane separation system is connected to an inlet of the secondary membrane separation system;

Both the primary membrane separation system and the secondary membrane separation system comprise an organic-permselective pervaporation membrane.

Further, the system for simultaneously preparing alcohol-free wine and high-alcohol liquor further comprises a feed tank and a primary permeate tank;

An outlet of a retentate of the primary membrane separation system is connected to the feed tank;

An inlet of the primary permeate tank is connected to an outlet of an permeate of the primary membrane separation system, an outlet of the primary permeate tank is connected to the inlet of the secondary membrane separation system, and an outlet of a retentate of the secondary membrane separation system is connected to the primary permeate tank.

Further, a first cooling device is further provided at the outlet of the permeate of the primary membrane separation system.

Further, a second cooling device is further provided at the outlet of the permeate of the secondary membrane separation system.

Further, a first pump is further provided between the primary membrane separation system and the feed tank.

Further, a first preheater is further provided between the primary membrane separation system and the feed tank.

Further, a first heat exchanger is further provided between the primary membrane separation system and the feed tank.

Further, a second pump is further provided between the secondary membrane separation system and the feed tank.

Further, a second preheater is further provided between the secondary membrane separation system and the feed tank.

Further, a second heat exchanger is further provided between the secondary membrane separation system and the feed tank.

Further, a vacuum system is further connected to the outlet of the permeate of the primary membrane separation system.

Further, a vacuum system is further connected to the outlet of the permeate of the secondary membrane separation system.

Further, the organic-permselective pervaporation membrane is a membrane capable of preferentially enriching organic matters on the permeate side. It is composed of a basement membrane and a separation layer, and the material of the basement membrane is sulfonated poly(aryl ether ketone).

Further, the sulfonated poly(aryl ether ketone) is preferably sulfonated polyether ketone (SPEK) or sulfonated polyether ketone ether ketone ketone (SPEKEKK).

Further, the pore size of the basement membrane is 5 nm-80 nm, preferably 8-20 nm.

Further, the material of the separation layer is an organophilic membrane material or a modified organophilic membrane material. The modified organophilic membrane material is a low surface energy material, and the modified substance is an inorganic introduction substance or an organic functional group.

Preferably, the material of the separation layer comprises hydrophobic nano titanium dioxide and amino-terminated modified polydimethylsiloxane.

Preferably, the ammonia value of the amino-terminated polydimethylsiloxane is 0.2-0.8.

Preferably, the mass ratio of the hydrophobic nano titanium dioxide to the amino-terminated polydimethylsiloxane is 0.5-2:100.

All membrane components and the pipelines, valves, storage tanks, etc. in contact with the wine sample meet the food-grade safety requirements.

The present invention further provides a method for simultaneously preparing alcohol-free wine and high-alcohol liquor by adopting the above system, comprising the following steps:

using the wine produced by fermentation as a feed, wherein the temperature of the feed is 35-45° C.; first, feeding the feed into the primary membrane separation system, wherein the pressure on a permeate side of the primary membrane separation system is maintained at 5-10 kPa, ethanol and aromatic substances therein permeate the membrane in a vapor form to form a primary permeate with alcohol content of 28-32°, and a primary retentate is the alcohol-free wine with alcohol content of less than 0.5°; and making the primary permeate enter the secondary membrane separation system at 35-45° C., wherein the pressure on the permeate side is 5-10 kPa, ethanol and aromatic substances therein permeate the membrane in a vapor form to form a secondary permeate, and the secondary permeate is the concentrated high-alcohol liquor.

Finally, alcohol-free wine can be collected by this process from the primary membrane separation system, and the nutrients in the raw wine can be well retained; at the same time, high-alcohol liquor can be obtained from the product tank of the secondary separation system to prepare other spirits.

Preferably, the first cooling device provided at the outlet of the permeate of the primary membrane separation system has a cooling temperature of −10° C. to −5° C.

Preferably, the second cooling device provided at the outlet of the permeate of the secondary membrane separation system has a cooling temperature of −15° C. to −8° C.

Preferably, the temperature at which the feed enters the primary membrane separation system is controlled by the first preheater and/or the first heat exchanger.

Preferably, the temperature at which the primary permeate enters the secondary membrane separation system is controlled by the second preheater and/or the second heat exchanger.

Preferably, the feed is red wine, white wine, pink wine or sparkling wine.

Wherein, the feeds are heated to 35-45° C. and then fed to the membrane separation system, which is on the one hand to obtain better separation effect and on the other hand not to destroy the flavor components and nutrients in the raw wine.

Wherein, after the feeds have been circulated for a certain period of time through the primary membrane separation system, the alcohol content of the wine sample on the feed side is less than 0.5°, which is alcohol-free wine; and the alcohol content of the liquid on the permeate side is 30-36°.

Wherein, the alcohol-free wine collected in the primary membrane separation system retains most of the nutrients of the raw wine.

Wherein, the primary permeate obtained in the primary membrane separation system is heated to 35-45° C. and then fed into the secondary membrane separation system, and the alcohol content of the finally obtained permeate exceeds 60°. The permeate can be used as a feed for making brandy or other spirits.

The pervaporation membrane separation technology of the present invention is one of the most promising alcoholic beverage dealcoholization technologies, and has the characteristics of high dealcoholization efficiency, no influence on wine quality, low energy consumption, no pollution, simple operation and the like.

By adopting the above technical solution, the present invention has the following beneficial effects:

1. It can effectively remove alcohol from wine at a low temperature. On the premise of not destroying the nutrients in the wine, the alcohol-free wine with a wider range of drinking occasions is prepared, which has greatly expanded the wine sales market.

2. While preparing alcohol-free wine, it can further obtain high-alcohol liquor, which can be used as a feed for preparing brandy and other spirits so as to realize the maximum resource utilization of wine.

3. The technology involved in the present invention is a physical process, without introducing any new chemical component, and no negative and harmful components are generated to the wine and high-alcohol liquor.

4. To sum up, the organic-permselective pervaporation membrane separation technology is utilized to process wine produced by fermentation to obtain alcohol-free wine and high-alcohol liquor for other uses, which will ultimately bring huge profits to wine producers.

BRIEF DESCRIPTION OF THE DRAWINGS

FIG. 1 is a schematic diagram of a structure for the system for simultaneously preparing alcohol-free wine and high-alcohol liquor:

Wherein, 1 is a feed tank, 2 is a first pump, 3 is a first preheater, 4 is a first heat exchanger, 5 is a primary membrane separation system, 6 is a first cooling device, 7 is a primary permeate tank, 8 is a second pump, 9 is a second preheater, 10 is a second heat exchanger, 11 is a secondary membrane separation system, 12 is a second cooling device, 13 is a high-alcohol liquor storage tank, and 14 is a vacuum system; and the arrows on the left and right sides of 6 and 12 indicate the flow direction of a refrigerant.

DETAILED DESCRIPTION

A system for simultaneously preparing alcohol-free wine and high-alcohol liquor as shown in FIG. 1, comprising a primary membrane separation system and a secondary membrane separation system, wherein an inlet of the primary membrane separation system is connected to feeds, and a permeate side of the primary membrane separation system is connected to an inlet of the secondary membrane separation system;

Both the primary membrane separation system and the secondary membrane separation system comprise an organic-permselective pervaporation membrane.

The system for simultaneously preparing alcohol-free wine and high-alcohol liquor further comprises a feed tank and a primary permeate tank;

An outlet of a retentate of the primary membrane separation system is connected to the feed tank;

An inlet of the primary permeate tank is connected to an outlet of an permeate of the primary membrane separation system, an outlet of the primary permeate tank is connected to the inlet of the secondary membrane separation system, and an outlet of a retentate of the secondary membrane separation system is connected to the primary permeate tank.

A first cooling device is further provided at the outlet of the permeate of the primary membrane separation system.

A second cooling device is further provided at the outlet of the permeate of the secondary membrane separation system.

A first pump is further provided between the primary membrane separation system and the feed tank.

A first preheater is further provided between the primary membrane separation system and the feed tank.

A first heat exchanger is further provided between the primary membrane separation system and the feed tank.

A second pump is further provided between the secondary membrane separation system and the feed tank.

A second preheater is further provided between the secondary membrane separation system and the feed tank.

A second heat exchanger is further provided between the secondary membrane separation system and the feed tank.

A vacuum system is further connected to the outlet of the permeate of the primary membrane separation system.

A vacuum system is further connected to the outlet of the permeate of the secondary membrane separation system.

The organic-permselective pervaporation membrane is a membrane capable of preferentially enriching organic matters on the permeate side. It is composed of a basement membrane and a separation layer, and the material of the basement membrane is sulfonated poly(aryl ether ketone).

The sulfonated poly(aryl ether ketone) is preferably sulfonated polyether ketone (SPEK) or sulfonated polyether ketone ether ketone ketone (SPEKEKK).

The pore size of the basement membrane is 5 nm-80 nm, preferably 8-20 nm.

The material of the separation layer is an organophilic membrane material or a modified organophilic membrane material. The modified organophilic membrane material is a low surface energy material, and the modified substance is an inorganic introduction substance or an organic functional group.

The material of the separation layer comprises hydrophobic nano titanium dioxide and amino-terminated polydimethylsiloxane.

The ammonia value of the amino-terminated polydimethylsiloxane is 0.2-0.8.

The mass ratio of the hydrophobic nano titanium dioxide to the amino-terminated polydimethylsiloxane is 0.5-2:100.

All membrane components and the pipelines, valves, storage tanks, etc. in contact with the wine sample meet the food-grade safety requirements.

At the time of use, the wine produced by fermentation is used as the feed, the temperature of the feed is controlled to 35-45° C. by the first preheater and/or the first heat exchanger; the feed is fed into the primary membrane separation system, wherein the pressure on the permeate side of the primary membrane separation system is maintained at 5-10 kPa, the first cooling device provided at the outlet of the permeate of the primary membrane separation system has a cooling temperature of −10° C. to −5° C., ethanol and aromatic substances therein permeate the membrane in a vapor form and then condense on the permeate side to form a primary permeate with alcohol content of 28-32°, a primary retentate is the alcohol-free wine with alcohol content of less than 0.5°, the primary permeate enters the secondary membrane separation system at 35-45° C. under control of the second preheater and/or the second heat exchanger, wherein the pressure on the permeate side is 5-10 kPa, the second cooling device provided at the outlet of the permeate of the secondary membrane separation system has a cooling temperature of −10° C. to −5° C., ethanol and aromatic substances therein permeate the membrane in a vapor form to form a secondary permeate on the permeate side, and the secondary permeate is the concentrated high-alcohol liquor.

Embodiment 1

The aforementioned system is adopted, wherein the material of the basement membrane of the organic-permselective pervaporation membrane is sulfonated polyether ketone (SPEK), the pore size of the basement membrane is 80 nm, the material of the separation layer is amino-terminated polydimethylsiloxane, the ammonia value of the amino-terminated polydimethylsiloxane is 0.2, and the mass ratio of the hydrophobic nano titanium dioxide to the amino-terminated polydimethylsiloxane is 0.5:100. The feed tank is filled with 50 kg of the wine feed (with alcohol content of 12.5 v/v %), heated to 45° C., and then fed into the primary membrane separation system by the feed pump. The feed side is circulated and the permeate side is vacuumized, with vacuum pressure of 5,000 Pa. The vapor on the permeate side is liquefied and collected in the first cooling device, the condensation temperature is maintained at −10° C., the alcohol content of the permeate is 36°, and the permeation flux is 0.72 kg/m$^2$h. The primary permeate is used as a feed for the secondary membrane separation process and is circulated at 45° C. The permeate side is vacuumized, with vacuum pressure of 5,000 Pa. Ethanol and aromatic substances are further enriched after passing through the membrane, and are condensed at −15° C. by the second cooling device on the permeate side of the secondary membrane separation system to obtain high-alcohol liquor with alcohol content of 64°. The permeation flux is 0.85 kg/m$^2$h.

Embodiment 2

The aforementioned system is adopted, wherein the material of the basement membrane of the organic-permselective pervaporation membrane is sulfonated polyether ketone ether ketone ketone (SPEKEKK), the pore size of the basement membrane is 20 nm, the material of the separation layer is amino-terminated modified polydimethylsiloxane, the ammonia value of the amino-terminated polydimethylsiloxane is 0.4, and the mass ratio of the hydrophobic nano titanium dioxide to the amino-terminated polydimethylsiloxane is 1:100. The feed tank is filled with 50 kg of the wine feed (with alcohol content of 12.5 v/v %), heated to 35° C., and then fed into the primary membrane separation system by the feed pump. The feed side is circulated and the permeate side is vacuumized, with vacuum pressure of 10,000 Pa. The vapor on the permeate side is liquefied and collected in the first cooling device, the condensation temperature is maintained at −10° C., the alcohol content of the permeate is 30°, and the permeation flux is 0.55 kg/m²h. The primary permeate is used as a feed for the secondary membrane separation process and is circulated at 35° C. The permeate side is vacuumized, with vacuum pressure of 10,000 Pa. Ethanol and aromatic substances are further enriched after passing through the membrane, and are condensed at −15° C. by the second cooling device on the permeate side of the secondary membrane separation system to obtain high-alcohol liquor with alcohol content of 60°. The permeation flux is 0.71 kg/m²h.

Embodiment 3

The aforementioned system is adopted, wherein the material of the basement membrane of the organic-permselective pervaporation membrane is sulfonated polyether ketone ether ketone ketone (SPEKEKK), the pore size of the basement membrane is 8 nm, the material of the separation layer is amino-terminated modified polydimethylsiloxane, the ammonia value of the amino-terminated polydimethylsiloxane is 0.6, and the mass ratio of the hydrophobic nano titanium dioxide to the amino-terminated polydimethylsiloxane is 1.5:100. The feed tank is filled with 50 kg of the wine feed (with alcohol content of 12.5 v/v %), heated to 35° C., and then fed into the primary membrane separation system by the feed pump. The feed side is circulated and the permeate side is vacuumized, with vacuum pressure of 10,000 Pa. The vapor on the permeate side is liquefied and collected in the first cooling device, the condensation temperature is maintained at −5° C., the alcohol content of the permeate is 30°, and the permeation flux is 0.55 kg/m²h. The primary permeate is used as a feed for the secondary membrane separation process and is circulated at 45° C. The permeate side is vacuumized, with vacuum pressure of 5,000 Pa. Ethanol and aromatic substances are further enriched after passing through the membrane, and are condensed at −10° C. by the second cooling device on the permeate side of the secondary membrane separation system to obtain high-alcohol liquor with alcohol content of 62°. The permeation flux is 0.78 kg/m²h.

Embodiment 4

The aforementioned system is adopted, wherein the material of the basement membrane of the organic-permselective pervaporation membrane is sulfonated polyether ketone (SPEK), the pore size of the basement membrane is 5 nm, the material of the separation layer is amino-terminated modified polydimethylsiloxane, the ammonia value of the amino-terminated polydimethylsiloxane is 0.8, and the mass ratio of the hydrophobic nano titanium dioxide to the amino-terminated polydimethylsiloxane is 2:100. The feed tank is filled with 50 kg of the wine feed (with alcohol content of 12.5 v/v %), heated to 45° C., and then fed into the primary membrane separation system by the feed pump. The feed side is circulated and the permeate side is vacuumized, with vacuum pressure of 5,000 Pa. The vapor on the permeate side is liquefied and collected in the first cooling device, the condensation temperature is maintained at −8° C., the alcohol content of the permeate is 30°, and the permeation flux is 0.73 kg/m²h. The primary permeate is used as a feed for the secondary membrane separation process and is circulated at 35° C. The permeate side is vacuumized, with vacuum pressure of 8,000 Pa. Ethanol and aromatic substances are further enriched after passing through the membrane, and are condensed at −8° C. by the second cooling device on the permeate side of the secondary membrane separation system to obtain high-alcohol liquor with alcohol content of 63°. The permeation flux is 0.76 kg/m²h.

The invention claimed is:

1. A method for simultaneously preparing alcohol-free wine and high-alcohol liquor, comprising the following steps:
   using a wine produced by fermentation as a feed, wherein a temperature of the feed is 35-45° C.; first, feeding the feed into a primary membrane separation system, wherein a pressure on a permeate side of the primary membrane separation system is maintained at 5-10 kPa, ethanol and aromatic substances therein permeate the membrane in a vapor form to form a primary permeate with alcohol content of 28-32°, and a primary retentate is the alcohol-free wine with alcohol content of less than 0.5°; and
   making the primary permeate enter a secondary membrane separation system at 35-45°° C., wherein a pressure on a permeate side of the secondary membrane separation system is 5-10 kPa, ethanol and aromatic substances therein permeate the membrane in a vapor form to form a secondary permeate, and the secondary permeate is the concentrated high-alcohol liquor,
   wherein
   both the primary membrane separation system and the secondary membrane separation system comprise an organic-permselective pervaporation membrane,
   the organic-permselective pervaporation membrane consists of a basement membrane and a separation layer, a material of the basement membrane is sulfonated poly (aryl ether ketone) selected from sulfonated polyether ketone and sulfonated polyether ketone ether ketone ketone, and a pore size of the basement membrane is 5 nm-80 nm,
   a material of the separation layer comprises hydrophobic nano titanium dioxide and amino-terminated modified polydimethylsiloxane, an ammonia value of the amino-terminated polydimethylsiloxane is 0.2-0.8.

2. The method according to claim 1, wherein an outlet of the permeate of the primary membrane separation system is provided with a first cooling device, with cooling temperature of −10° C. to −5° C.; and an outlet of the permeate of the secondary membrane separation system is provided with a second cooling device, with cooling temperature of −15° C. to −8° C.

3. The method according to claim 1, wherein the feed is red wine, white wine, pink wine or sparkling wine.

4. The method according to claim 1, wherein the system for simultaneously preparing alcohol-free wine and high-alcohol liquor further comprises a feed tank and a primary permeate tank, an outlet of a retentate of the primary membrane separation system is connected to the feed tank, and an inlet of the primary permeate tank is connected to an outlet of an permeate of the primary membrane separation system, an outlet of the primary permeate tank is connected to the inlet of the secondary membrane separation system, and an outlet of a retentate of the secondary membrane separation system is connected to the primary permeate tank.

5. The method according to claim 1, wherein an outlet of the permeate of the primary membrane separation system is further provided with a first cooling device; and an outlet of the permeate of the secondary membrane separation system is further provided with a second cooling device.

6. The method according to claim 1, wherein the pore size of the basement membrane is 8-20 nm.

7. The method according to claim 1, wherein a mass ratio of the hydrophobic nano titanium dioxide to the amino-terminated polydimethylsiloxane is 0.5-2:100.

8. The method according to claim 1, wherein all membrane components and pipelines, valves, and storage tanks in contact with the wine sample meet food-grade safety requirements.

* * * * *